(12) United States Patent
Porter (10) Patent No.: US 9,705,977 B2
(45) Date of Patent: Jul. 11, 2017

(54) LOAD BALANCING FOR NETWORK DEVICES

(75) Inventor: Kevin Porter, Guelph (CA)

(73) Assignee: Symantec Corporation, Mountain View, CA (US)

( * ) Notice: Subject to any disclaimer, the term of this patent is extended or adjusted under 35 U.S.C. 154(b) by 341 days.

(21) Appl. No.: 13/090,489

(22) Filed: Apr. 20, 2011

(65) Prior Publication Data

US 2012/0271964 A1 Oct. 25, 2012

(51) Int. Cl.
*G06F 15/16* (2006.01)
*H04L 29/08* (2006.01)

(52) U.S. Cl.
CPC ...... *H04L 67/1008* (2013.01); *H04L 67/2842* (2013.01)

(58) Field of Classification Search
CPC ............... H04L 47/125; H04L 67/1008; H04L 67/10012; G06F 9/50
USPC ........................................................ 709/235
See application file for complete search history.

(56) References Cited

U.S. PATENT DOCUMENTS

| | | | |
|---|---|---|---|
| 5,539,883 A | 7/1996 | Allon | |
| 5,774,669 A * | 6/1998 | George et al. | 709/224 |
| 6,128,279 A | 10/2000 | O'Neil | |
| 6,266,335 B1 * | 7/2001 | Bhaskaran | 370/399 |
| 6,327,622 B1 * | 12/2001 | Jindal | G06F 9/5055 709/228 |
| 6,728,748 B1 * | 4/2004 | Mangipudi | H04L 69/329 709/226 |
| 6,772,333 B1 * | 8/2004 | Brendel | H04L 63/04 709/227 |
| 7,035,930 B2 * | 4/2006 | Graupner | G06F 9/5088 709/221 |
| 7,155,722 B1 * | 12/2006 | Hilla | G06F 9/505 709/223 |
| 7,260,647 B2 * | 8/2007 | Espieu et al. | H04L 45/00 709/238 |
| 7,403,993 B2 * | 7/2008 | John et al. | 709/226 |
| 7,703,102 B1 * | 4/2010 | Eppstein et al. | 718/104 |
| 7,752,629 B2 * | 7/2010 | Revanuru et al. | G06F 9/505 709/201 |
| 7,860,964 B2 * | 12/2010 | Brady et al. | 709/223 |
| 8,863,096 B1 * | 10/2014 | Bucur | G06F 9/5088 717/124 |
| 8,875,029 B1 * | 10/2014 | Naidu | G06Q 10/107 715/752 |
| 2002/0078263 A1 * | 6/2002 | Darling et al. | 709/331 |
| 2002/0112085 A1 * | 8/2002 | Berg | H04L 29/06 709/250 |
| 2002/0178262 A1 * | 11/2002 | Bonnell | G06F 9/5083 709/225 |
| 2003/0069972 A1 * | 4/2003 | Yoshimura | H04L 12/4645 709/226 |
| 2003/0108018 A1 * | 6/2003 | Dujardin et al. | 370/338 |

(Continued)

*Primary Examiner* — Blake Rubin
(74) *Attorney, Agent, or Firm* — Baker Botts L.L.P.

(57) ABSTRACT

In one embodiment, an electronic device receives a request; obtains a current state from each of a plurality of electronic devices; and selects one of the plurality of electronic devices to service the request based on the current state of each of the plurality of electronic devices. The current state of each of the plurality of electronic devices is one of a plurality of states in a state model. Each of the plurality of states in the state model indicates a discrete level of workload for the plurality of electronic devices.

33 Claims, 3 Drawing Sheets

(56) References Cited

U.S. PATENT DOCUMENTS

| | | | |
|---|---|---|---|
| 2003/0120593 A1* | 6/2003 | Bansal | G06F 17/30873 705/39 |
| 2003/0187978 A1* | 10/2003 | Nakamura et al. | 709/224 |
| 2003/0210694 A1* | 11/2003 | Jayaraman | H04L 67/1008 370/392 |
| 2004/0105416 A1* | 6/2004 | Rue | H04L 12/24 370/338 |
| 2004/0111529 A1 | 6/2004 | Parmar | |
| 2004/0201711 A1* | 10/2004 | Lopaz | H04N 1/00408 348/211.99 |
| 2004/0210663 A1* | 10/2004 | Phillips et al. | 709/230 |
| 2005/0027862 A1* | 2/2005 | Nguyen et al. | 709/225 |
| 2005/0033858 A1* | 2/2005 | Swildens | H04L 29/12066 709/232 |
| 2005/0050138 A1* | 3/2005 | Creamer et al. | 709/200 |
| 2005/0076051 A1* | 4/2005 | Carobus | G06Q 30/02 |
| 2005/0188073 A1* | 8/2005 | Nakamichi et al. | 709/223 |
| 2006/0087968 A1* | 4/2006 | Bowen | H04L 29/06 370/229 |
| 2006/0101119 A1* | 5/2006 | Qureshi | G06Q 10/107 709/206 |
| 2006/0190603 A1* | 8/2006 | Anzai | H04L 12/2854 709/226 |
| 2006/0242320 A1* | 10/2006 | Nettle et al. | 709/245 |
| 2007/0118631 A1* | 5/2007 | Devarakonda | H04L 41/06 709/223 |
| 2007/0124431 A1* | 5/2007 | Sharma | H04L 67/1008 709/219 |
| 2007/0124476 A1* | 5/2007 | Oesterreicher et al. | 709/226 |
| 2007/0192863 A1* | 8/2007 | Kapoor et al. | 726/23 |
| 2009/0064168 A1* | 3/2009 | Arimilli | G06F 9/522 718/105 |
| 2009/0106840 A1* | 4/2009 | Dreymann | G06F 21/56 726/23 |
| 2009/0172693 A1* | 7/2009 | Corum | G06F 9/505 718/105 |
| 2009/0217369 A1* | 8/2009 | Abeni et al. | 726/13 |
| 2009/0328054 A1* | 12/2009 | Paramasivam | G06F 9/505 718/105 |
| 2010/0036903 A1* | 2/2010 | Ahmad | H04L 67/1002 709/202 |
| 2010/0106990 A1* | 4/2010 | Kalman | 713/323 |
| 2010/0115327 A1* | 5/2010 | Lee | 714/4 |
| 2010/0131946 A1* | 5/2010 | Degaonkar | G06F 11/2025 718/1 |
| 2010/0205258 A1* | 8/2010 | Smelyansky | H04L 51/36 709/206 |
| 2010/0302939 A1* | 12/2010 | Denis | H04L 12/5695 370/230 |
| 2010/0318827 A1* | 12/2010 | Shah | G06F 1/3203 713/324 |
| 2011/0022689 A1* | 1/2011 | Piepenbrink | H04L 12/4679 709/221 |
| 2011/0246657 A1* | 10/2011 | Glow | H04L 65/1063 709/231 |
| 2011/0252103 A1* | 10/2011 | Beyer | G06Q 10/107 709/206 |
| 2011/0252127 A1* | 10/2011 | Iyengar | G06F 9/5033 709/224 |
| 2011/0282982 A1* | 11/2011 | Jain | G06F 9/5094 709/223 |
| 2011/0295942 A1* | 12/2011 | Raghunath et al. | 709/203 |
| 2012/0300623 A1* | 11/2012 | Nakao | H04W 28/08 370/230 |
| 2012/0314575 A1* | 12/2012 | Frank et al. | 370/235 |

* cited by examiner

LOAD BALANCING FOR NETWORK DEVICES

TECHNICAL FIELD

This disclosure generally relates to load balancing for network devices.

BACKGROUND

In networking, load balancing is a technique to distribute workload evenly across multiple resources, such as servers, computers, network links, processors, hard drives, or other resources, in order to get optimal resource utilization, maximize throughput, minimize response time, and avoid overload. Using multiple resources with load balancing, instead of a single resource, may also increase reliability through redundancy. One of the common applications of load balancing is to provide a single network (e.g., Internet) service from multiple servers, sometimes known as a server farm. For example, load-balanced systems may include popular web sites, large Internet Relay Chat networks, high-bandwidth File Transfer Protocol sites, Network News Transfer Protocol (NNTP) servers, and Domain Name System (DNS) servers. More recently, some load balancers have evolved to support databases, which are referred to as database load balancers.

The load balancing service is usually provided by a dedicated software program or hardware device, such as a multilayer switch. For example, for network services, a load balancer may be a software program that listens on the port where external clients connect to access the services. The load balancer forwards the service requests from the external clients to specific ones of the "backend" servers. For example, upon receiving a service request from an external client, the load balancer may select one of the backend servers based on the current workload of the individual servers, and forwards the service request to the selected backend server to be serviced. This allows the service requests to be serviced without the external clients ever knowing about the internal separation of functions. It also prevents the external clients from contacting the backend servers directly, which may have security benefits by hiding the structure of the internal network and preventing attacks on the kernel's network stack or unrelated services running on other ports.

SUMMARY

This disclosure generally relates to load balancing for network devices.

In particular embodiments, an electronic device receives a request; obtains a current state from each of a plurality of electronic devices; and selects one of the plurality of electronic devices to service the request based on the current state of each of the plurality of electronic devices. The current state of each of the plurality of electronic devices is one of a plurality of states in a state model. Each of the plurality of states in the state model indicates a discrete level of workload for the plurality of electronic devices.

These and other features, aspects, and advantages of the disclosure are described in more detail below in the detailed description and in conjunction with the following figures.

DESCRIPTION OF EXAMPLE EMBODIMENTS

This disclosure is now described in detail with reference to a few embodiments thereof as illustrated in the accompanying drawings. In the following description, numerous specific details are set forth in order to provide a thorough understanding of this disclosure. However, this disclosure may be practiced without some or all of these specific details. In other instances, well known process steps and/or structures have not been described in detail in order not to unnecessarily obscure this disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

In networking, load balancing is often applied to application servers. Consequently, existing network load balancers are typically designed to handle application server load balancing (i.e., load balancing for backend servers) where the workload often consists of requests from clients for content supplied directly by the application servers. More recently, content caching is increasingly utilized, where the network content is cached to reduce bandwidth usage, server load, and perceived lag. A network caching device (e.g., cache appliance or cache server) may store copies of the content passing through it, and subsequent requests for the cached content may be satisfied by the network caching device if certain conditions are met. In addition, there may be other types of network devices, such as intermediary network devices or proxy devices, in a network environment. For example, an intermediary network device may be situated between a client and a backend server, acting as a conduit between the client and the server. In some cases, the intermediary network device may condition or modify the communications between the client and the server.

Figure 1:
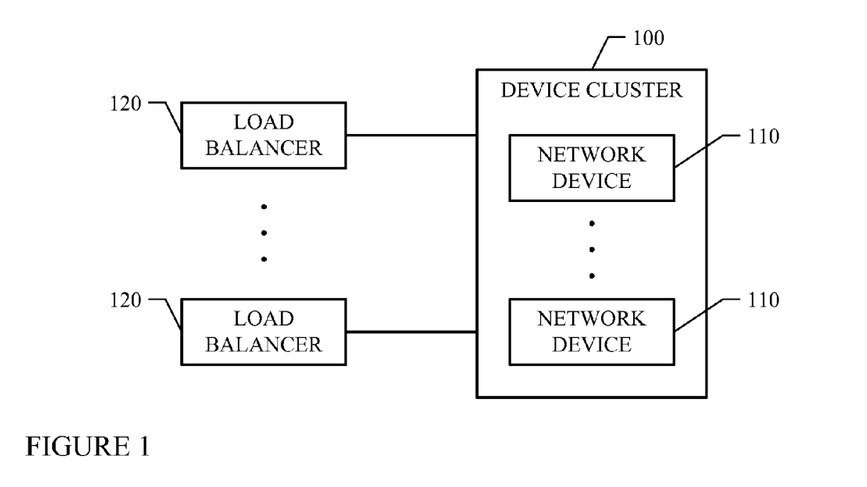
FIG. 1 illustrates an example cache farm or cluster.

Similar to a server farm or a server cluster, which includes a collection or group of computer servers (e.g., application or backend servers), a collection or group of network devices may form a device cluster. FIG. 1 illustrates an example device cluster 100, which may include any number of network devices 110. In particular embodiments, each network device 110 is a non-endpoint device. For example, network devices 110 may be network intermediary devices, proxy devices, or caching devices. Furthermore, there may be different types of network devices 110 in device cluster 100. This disclosure contemplates any applicable type of network devices 110.

In particular embodiments, network devices 110 may be caching devices. In particular embodiments, each caching device may include a data store for storing copies of network content. For example, each caching device may be a CacheFlow appliance (e.g., CacheFlow 5000 Series) made by Blue Coat Systems, Inc. based in Sunnyvale, Calif. The Blue Coat CacheFlow appliances enable network service providers to manage increases in network traffic and subscriber growth, and save bandwidth on expensive international links and backhaul traffic while improving the end-user experience by utilizing highly effective web caching technology. In addition, the Blue Coat CacheFlow appliances may filter and secure network traffic and illegal content, and enable their users to customize exceptions and blocked sites.

In particular embodiments, load balancing may be applied to device cluster 100. In particular embodiments, one or more load balancers 120 may provide load balancing for device cluster 100. Each load balancer 120 may be a hardware device or a software program, and may be dedicated to provide load balancing for deice cluster 100.

Balancing workload in a cluster of non-endpoint network devices (e.g., device cluster 100) may introduce additional complexities not well-served by existing network load balancers, such as Multilayer Switches (MLS) or more specifically, Layer 4-7 switches, content switches, web switches, application switches, or routers. For example, when balancing workload for a cluster of caching devices, since the caching devices do not "own" the content they cache and serve, it may be desirable to localize client requests for equivalent content to a single or small set of caching devices in a large cache cluster. Health checks and capacity checks that treat the caching devices as endpoints for communications rather than conduits do not adequately capture the true readiness of each specific caching device to handle additional workload or even to function properly at all. Moreover, a caching device's responses to ICMP (Internet Control Message Protocol) pings and port 80 HTTP (Hypertext Transfer Protocol) GETs (usually for requesting content, such as web pages, from devices, such as servers) are not particularly informative about whether the caching device can actually proxy client requests to a network (e.g., the Internet) and back, because when the caching device is configured as a transparent proxy, these responses are typically returned as errors. The latency incurred by such probes is largely unrelated to the actual resource conditions in the proxy-processing pathway of the caching device. Load metrics based on naïve resource measurements (e.g., the percentage of processor utilization or memory usage), which are used by existing network load balancers, ignore the fact that the readiness of a complex caching device (e.g., a cache appliance) to handle workload is related to such low-level metrics in a highly non-linear manner. Some existing load-balancing schemes require the load balancers to be configured in a complex manner, essentially forcing the load balancers to "understand" the resource and capacity thresholds of the caching devices in order to take appropriate actions. Other existing load-balancing schemes simply adopt a binary up/down view of each caching device's availability, which is either wasteful of caching resources, when the system is tuned to avoid false negatives, or vulnerable to interruptions and user-visible outrages, when the system is insufficiently sensitive to false positives.

To improve load balancing for network device clusters, particular embodiments provide a state model that reduces the overall self-assessed load-handling capability of the network devices into a relatively small set of values (i.e., states), each of which has a distinct interpretation by a load balancer. In particular embodiments, each state value may be represented as a SNMP (Simple Network Management Protocol) variable, or encoded as a HTTP response code, or implemented as simple text (e.g., within a HTML (Hypertext Markup Language) or text document). In particular embodiments, a load balancer (e.g., load balancer 120) may poll on the network devices (e.g., network devices 110) it balances to get their current state values. Other means of representing and communicating the state values are also possible, and this disclosure contemplates any suitable means for representing and communicating the state values. In particular embodiments, a load balancer only needs to be able to respond to the discrete states of the state model and does not need to be "programmed" for each network device under its management. In addition, states may be grouped together to further reduce the number of possible cases (i.e., states). In particular embodiments, the state model requires only basic self-awareness on the part of the network devices. This may be extended to more detailed levels of resource assessment as needed. The state model may serve as an interface, insulating device behavior from load balancing concerns and minimizing the amount of information that needs to be exchanged between the load balancers and the network devices to obtain optimal results.

The following table illustrates the states of an example state model according to one embodiment of this disclosure. In this example, the states are each represented as a SNMP variable that a load balancer may poll on each network device under its management. Note that different state models may have different states as well as different interpretations and actions corresponding to each state.

TABLE 1

EXAMPLE STATE MODEL

| ID | STATE | DESCRIPTION | LOAD BALANCING IMPLICATION |
|---|---|---|---|
| 0 | down | The network device is not responsive to state inquires. The network device may be powered down, still booting, crashed, mis-configured, on fire, stolen, etc. and is not capable of doing anything useful. | No connections should be sent to this network device. |
| 1 | underused | The network device is operating normally and is not subject to any unusual resource constraint. Resource utilization is low compared to capacity (i.e., headroom is ample). | Load balance normally. Significant increases in load should be acceptable without escalation of the state. If possible, this network device should be prioritized over other network devices in the same device cluster that report higher states when determining how to handle any load shed by network devices that are in states of overcapacity. |
| 2 | normal | The network device is operating normally and is not subject to any unusual resource constraint. This is the normal operational state. | Load balance normally. As long as this network device is in this state, increases in load should be handled without any negative effect. |

TABLE 1-continued

EXAMPLE STATE MODEL

| ID | STATE | DESCRIPTION | LOAD BALANCING IMPLICATION |
|---|---|---|---|
| 3 | burdened | The network device is operating normally but is nearing resource constraints (i.e., headroom is limited). | Load balance carefully. Load may be increased, but any balancing heuristics may want to take into account that large increases will likely cause this network device to transition to a more severely constrained state. |
| 4 | stressed | The network device has reached an effective capacity limit and cannot stably handle additional traffic. | Do not increase load on this network device; reduce load if possible. For example, this may mean that new connections are throttled so that no new connections are opened without at least one existing connection being closed. |
| 5 | overtaxed | Load on the network device has exceeded maximum sustainable capacity and should be decreased. The network device may be implementing emergency load-shedding techniques, which may hamper its effectiveness. | Reduce load by whatever means necessary until this network device transitions to a less-severe state. Reduction of load is expected to allow this network device to return to "stressed", "burdened", or "normal". |
| 6 | overloaded | Load on the network device has reached an unsustainable level and must be decreased immediately. If load is not reduced, there is a risk of instability or failure. | Allow existing connections to drain but do not initiate any further connections. Reduction of load is expected to allow this network device to return to "stressed", "burdened", or "normal", at which point new connections may once again be opened. |
| 7 | halting | The network device is in the process of shutting down, either at user direction (an administrative take-down) or due to a severe error that may require operator intervention to resolve. This is expected to be a temporary state, which will transition to "offline". | Allow existing connections to drain but do not initiate any further connections. Once all connections have been drained, this network device should be expected to enter the "offline" state. |
| 8 | offline | The network device is out of service and unable to handle any traffic. This state is distinguished from state 0 (down) by the fact that the device is actually responding to state inquires. | No connections should be sent to this network device. |
| 9 | initializing | The network device is preparing to enter service but is not yet ready to handle traffic | No connections should be sent to this network device. This network device may respond successfully to L2/L4 health checks, or even L7 checks, depending on their format, but this should not be taken as evidence of readiness to handle any load. This network device should transition to the "normal" state shortly once it has completed start-up and self-check. |

Note that in the above example state mode, "halting" and "initializing" are inherently transitional states. "Halting" in particular is intended to support a graceful administrative removal-from-service requirement. States 1 to 6 (i.e., from "underused" to "overloaded") form an ordered spectrum of readiness. In some implementations, the "burdened" state may be interpreted as an advisory rather than a demand for any discrete change in behavior. For example, a load balancer that is sensitive to more severe states may treat it as "normal". Similarly, the "underused" state may be an advisory that may be treated as "normal" without violating the state model. This state is to facilitate identification of network devices that can handle unusual load increases if they become necessary. Both the "overtaxed" and "overloaded" states may indicate that load needs to be reduced. The difference may be in the urgency of the load reduction. For example, an "overtaxed" network device may hunker on gamely at reduced effectiveness, while an "overloaded" network device may be in imminent danger of failure and restart if load is not reduced soon.

In a hash-based load-balancing scheme, there may be "hot spots" due to asymmetries in incoming traffic. With sufficient load, this may cause one or more network devices to enter the "stressed" state or worse. Load ordinarily intended for these network devices now needs to be directed elsewhere. For this purpose, in some implementations, "underused" network devices may represent cool spots where this diverted load may be preferentially directed to maintain better overall balance.

Since state polling is discrete, it is possible that some transitions may be missed. In some implementations, certain transition restrictions may be inferred. For example, the "initializing" state can only be entered directly from the "offline" or "down" state. Any network device observed to be initializing has previously considered itself to be completely out of service at some point. In other words, a load balancer may see that state transition from "normal" to "initializing", and conclude that in between samples, the network device has transitioned through "offline" and that any connections in progress have been lost. In practice, some hysteresis may be expected at times. For example, a network device that escalates from "overtaxed" to "overloaded" may not change state until load drops to the point where the appropriate state is once again "normal". State transitions may not be continuous even as load monotonically increases or decreases. For example, it may be likely that a network device may move directly from "initializing" to "normal" without transiting "underused".

In particular embodiments, each network device (e.g., network cache appliance) may determine its own current state at any given time based on its own resource or load-balancing metrics. Consequently, a load balancer only needs to poll each network device under its management for that device's current state without having to be aware of the detailed metrics information of that network device. Based on the current states of the network devices under its management, the load balancer may determine to which device (e.g., a network device having the "underused", "normal", or "burdened" state) a new request should be sent.

Figure 2:
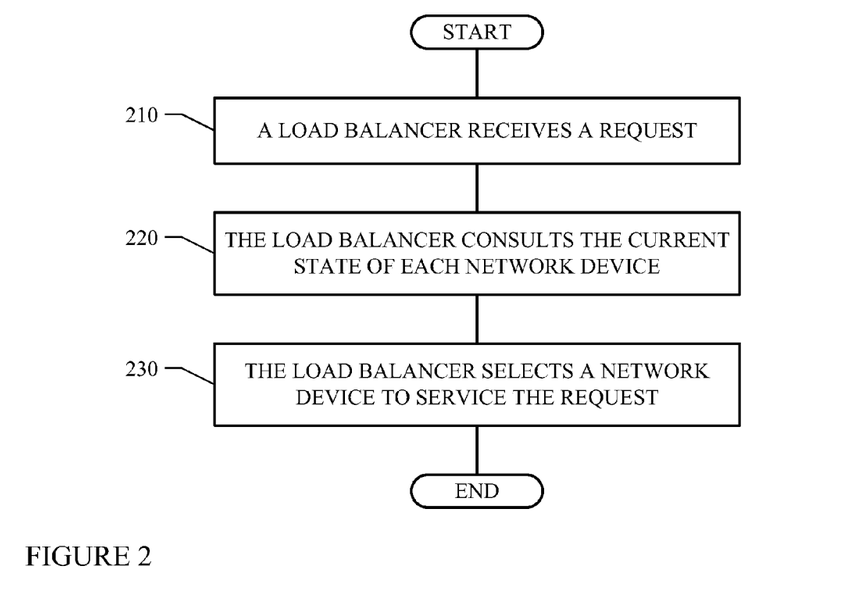
FIG. 2 illustrates an example method for balancing the load using a state model.

FIG. 2 illustrates an example method for balancing the load using a state model (e.g., the one illustrated in TABLE 1). In particular embodiments, a load balancer may receive a request from, for example, a client, as illustrated in STEP 210. The load balancer may consult the current state of each network device under its management, as illustrated in STEP 220. For example, suppose that each state is represented as a SNMP variable. In this case, the load balancer may poll each network device using an appropriate SNMP command.

In some implementations, in a network environment, the state model may be identified by an object identifier (OID), which may be a unique number or a unique group of numbers (e.g., "".1.3.6.1.4.1.14501.3.2.1.2.3.0"). The individual state values may be implemented as integers or enumerations. For example, the following pseudo code may be used to define a data structure that implements the states in the example state model illustrated in TABLE 1.

TABLE 2

EXAMPLE DATA STRUCTURE FOR AN EXAMPLE STATE MODEL cfloCapacitySystemLoadState OBJECT-TYPE
SYNTAX INTEGER {
    down(0),
    underused(1),
    normal(2),
    burdened(3),
    stressed(4),
    overtaxed(5),
    overloaded(6),
    halting(7),
    offline(8),
    initializing(9)
}

In some implementations, a load balancer may maintain a record (e.g., a table) of the state values of the network devices under its management. Periodically or from time to time, the load balancer may poll each network device for its current state value and update the corresponding record entry for the network device. The load balancer may use this record when it needs to consult the states of the network devices upon receiving a request.

Based on the current states of the network devices, the load balancer may select a specific network device to service the request, as illustrated in STEP 230. For example, the load balancer may select a network device that has the "underused", "normal", or "burdened" state to service the request. If necessary (e.g., none of the network devices has the "underused", "normal", or "burdened" state), the load balancer may select a network device that has the "stressed", "overtaxed", or "overloaded" state to service the request. In some implementations, the load balancer may preferentially select a network device with a lower state value over a network device with a higher state value. For example, if there are network devices with the "underused" state, the load balancer may select one of these network devices to service the request first, and only if there is no network device with the "underused" state does the load balancer selects a network device with the "normal" state to service the request. Similarly, if there is no network device with the "underused" state but there are network devices with the "normal" state, then the load balancer may select one of the network devices with the "normal" state to service the request first, and only if there is no network device with the "underused" or "normal" state does the load balancer selects a network device with the "burdened" state to service the request.

As indicated above, in particular embodiments, each network device may determine its own current state at any given time based on its own resource or load-balancing metrics. For example, a network device may examine its processor usage, network bandwidth, storage availability, or the number of requests it is servicing at a given time to determine its current state. This disclosure contemplates any suitable means for a network device to determine its state at a given time. Moreover, each network device may determine its current state without the load balancer being aware of the internal working the network device.

The load balancer may simply obtain the current state of each network device from that network device. As a result, the state model may be applied to almost any capacity-sensitive load-balancing scheme that a load balancer cares to implement. Instead of having to compare and compute multiple discrete capacity values, which may vary from device to device, the load balancer only needs to consider a single, simple value, which is limited in scope and has a pre-established interpretation.

Figure 3:
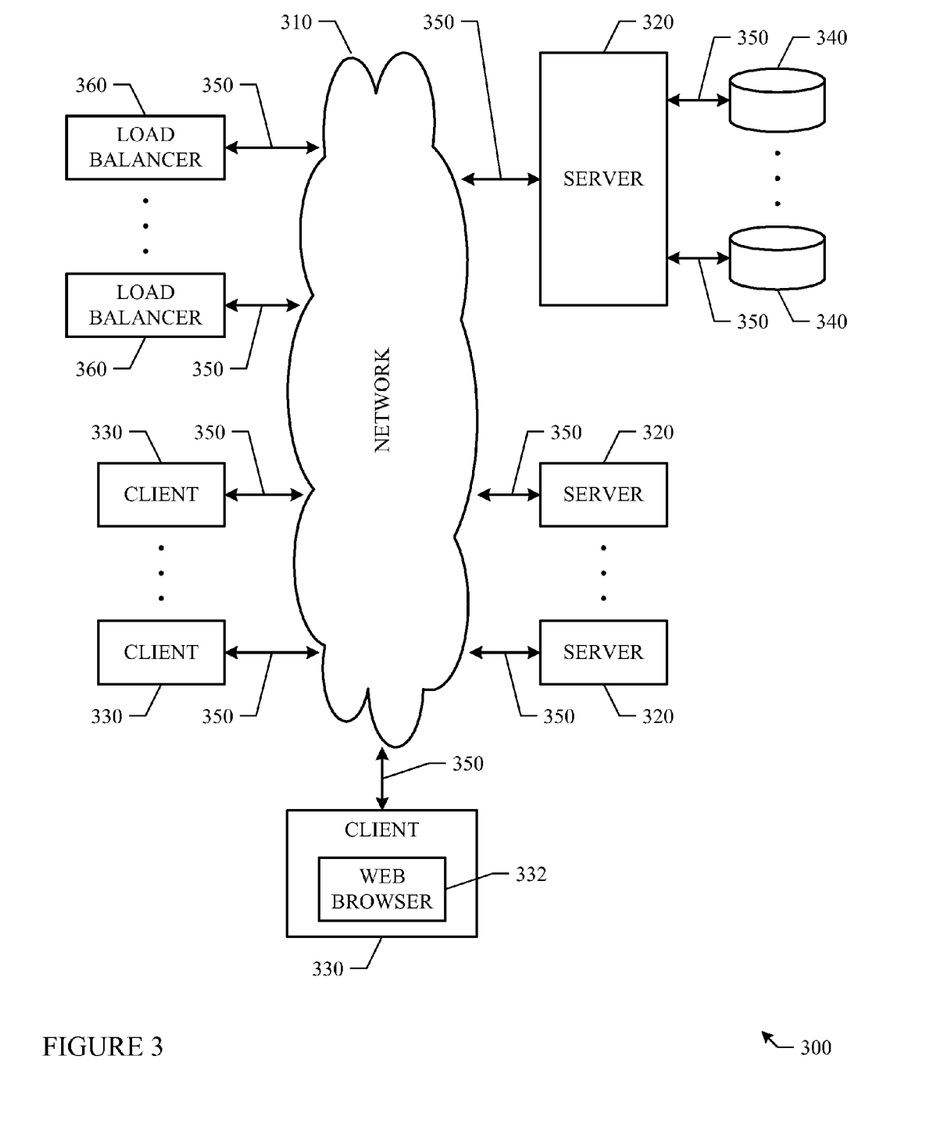
FIG. 3 illustrates an example network environment.

Particular embodiments may be implemented in a network environment. FIG. 3 illustrates an example network environment 300. Network environment 300 includes a network 310 coupling one or more servers 320 and one or more clients 330 to each other. In particular embodiments, network 310 is an intranet, an extranet, a virtual private network (VPN), a local area network (LAN), a wireless LAN (WLAN), a wide area network (WAN), a metropolitan area network (MAN), a portion of the Internet, or another network 310 or a combination of two or more such networks 310. This disclosure contemplates any suitable network 310.

One or more links 350 couple a server 320 or a client 330 to network 310. In particular embodiments, one or more links 350 each includes one or more wireline, wireless, or optical links 350. In particular embodiments, one or more links 350 each includes an intranet, an extranet, a VPN, a LAN, a WLAN, a WAN, a MAN, a portion of the Internet, or another link 350 or a combination of two or more such links 350. This disclosure contemplates any suitable links 350 coupling servers 320 and clients 330 to network 310.

In particular embodiments, each server 320 may be a unitary server or may be a distributed server spanning multiple computers or multiple datacenters. Servers 320 may be of various types, such as, for example and without limitation, web server, news server, mail server, message server, advertising server, file server, application server, exchange server, database server, or proxy server. In particular embodiments, each server 320 may include hardware, software, or embedded logic components or a combination of two or more such components for carrying out the appropriate functionalities implemented or supported by server 320. For example, a web server is generally capable of hosting websites containing web pages or particular elements of web pages. More specifically, a web server may host HTML files or other file types, or may dynamically create or constitute files upon a request, and communicate them to clients 330 in response to HTTP or other requests from clients 330. A mail server is generally capable of providing electronic mail services to various clients 330. A database server is generally capable of providing an interface for managing data stored in one or more data stores. In particular embodiments, some servers 320 may be caching devices, proxy devices, or intermediary network devices.

In particular embodiments, one or more data storages 340 may be communicatively linked to one or more severs 320 via one or more links 350. In particular embodiments, data storages 340 may be used to store various types of information. In particular embodiments, the information stored in data storages 340 may be organized according to specific data structures. In particular embodiments, each data storage 340 may be a relational database. Particular embodiments may provide interfaces that enable servers 320 or clients 330 to manage, e.g., retrieve, modify, add, or delete, the information stored in data storage 340.

In particular embodiments, each client 330 may be an electronic device including hardware, software, or embedded logic components or a combination of two or more such components and capable of carrying out the appropriate functionalities implemented or supported by client 330. For example and without limitation, a client 330 may be a desktop computer system, a notebook computer system, a netbook computer system, a handheld electronic device, or a mobile telephone. This disclosure contemplates any suitable clients 330. A client 330 may enable a network user at client 330 to access network 330. A client 330 may enable its user to communicate with other users at other clients 330.

A client 330 may have a web browser 332, such as MICROSOFT INTERNET EXPLORER, GOOGLE CHROME, APPLE SAFARI, or MOZILLA FIREFOX, and may have one or more add-ons, plug-ins, or other extensions, such as TOOLBAR or YAHOO TOOLBAR. A user at client 330 may enter a Uniform Resource Locator (URL) or other address directing the web browser 332 to a server 320, and the web browser 332 may generate a Hyper Text Transfer Protocol (HTTP) request and communicate the HTTP request to server 320. Server 320 may accept the HTTP request and communicate to client 330 one or more Hyper Text Markup Language (HTML) files responsive to the HTTP request. Client 330 may render a web page based on the HTML files from server 320 for presentation to the user. This disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

In particular embodiments, there may be any number of load balancers 360 connected to network 310. Each load balancer 360 may balance the workload for a number of network devices under its management, as described above.

Figure 4:
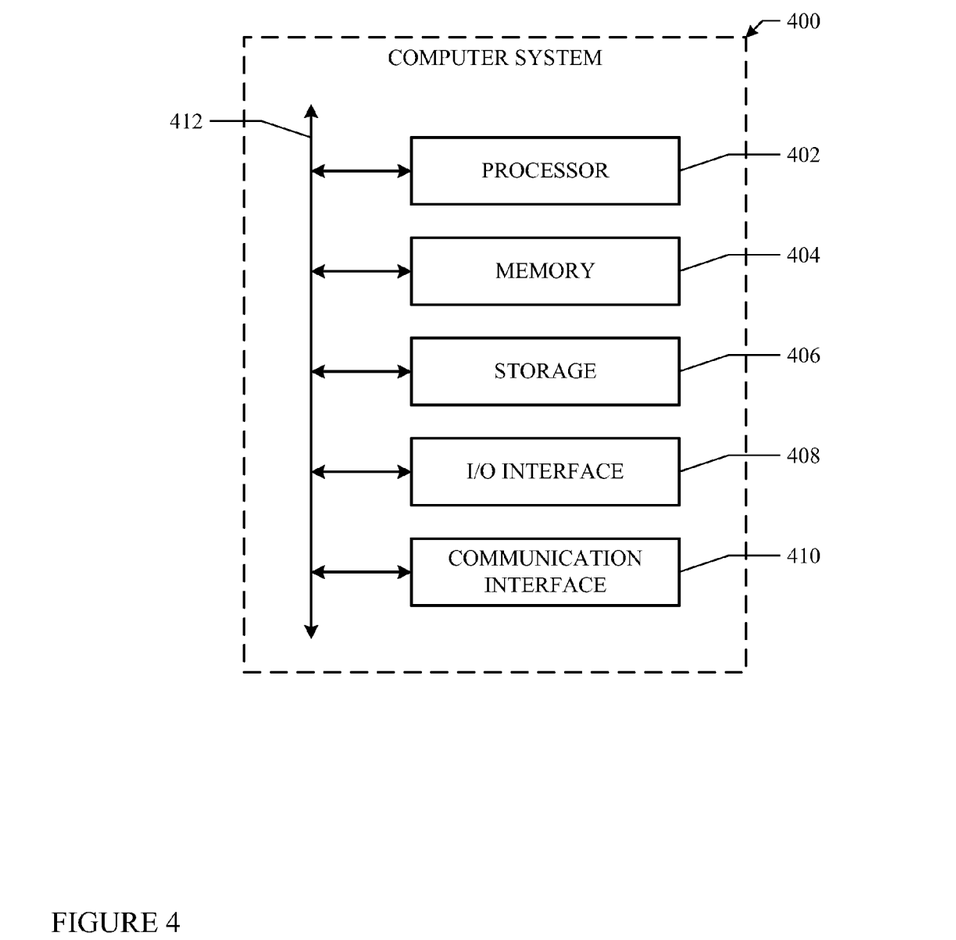
FIG. 4 illustrates an example computer system.

Particular embodiments may be implemented on one or more computer systems. FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 400 may include one or more computer systems 400; be unitary or distributed; span multiple locations; span multiple machines; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include an HDD, a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packetbased communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 402 (such as, for example, one or more internal registers or caches), one or more portions of memory 404, one or more portions of storage 406, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA, C, or C++. In particular embodiments, software is expressed in Hyper Text Markup Language (HTML), Extensible Markup Language (XML), or other suitable markup language.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by an electronic device:
receiving a request;
obtaining a current state indicator from each of a plurality of electronic devices, wherein:
the current state indicator of each of the plurality of electronic devices is one of a plurality of state indicators in a state model;
the state model is configured to indicate discrete levels of workload for the plurality of electronic devices, the discrete levels comprising:
a first discrete level comprising two or more state indicators that indicate that an associated electronic device is operating below a capacity of the associated electronic device and is configured to accept an increase in workload;
a second discrete level comprising two or more state indicators that indicate that an associated electronic device is operating at or above the capacity of the electronic device and is configured to accept an increase in workload if none of the plurality of electronic devices are assigned a state indicator of the first discrete level; and
a third discrete level comprising two or more state indicators that indicate that an associated electronic device is configured to deny an increase in workload; and
selecting one of the plurality of electronic devices to service the request based on the current state indicator of each of the plurality of electronic devices.

2. The method of claim 1, wherein the one electronic device selected to service the request is an electronic device currently having a lowest level of workload, as indicated by the state model, among the plurality of electronic devices.

3. The method of claim 1, wherein:
the state model is represented as a Simple Network Management Protocol (SNMP) variable; and
the current state indicator of each of the plurality of electronic devices is obtained from the electronic device using a SNMP command.

4. The method of claim 1, wherein the current state indicator of each of the plurality of electronic devices is obtained from the electronic device using a Hypertext Transfer Protocol (HTTP) command.

5. The method of claim 1, wherein each of the plurality of electronic devices determines its own current state indicator based on one or more resource metrics of the electronic device.

6. The method of claim 1, wherein each of the plurality of electronic devices determines its own current state indicator based on one or more workload metrics of the electronic device.

7. The method of claim 1, wherein the plurality of electronic devices is a plurality of intermediary network devices.

8. The method of claim 1, wherein the plurality of electronic devices is a plurality of proxy devices.

9. The method of claim 1, wherein:
the plurality of electronic devices is a plurality of caching devices; and
the request is a request for cached content.

10. The method of claim 1, further comprising forwarding the request to the selected one electronic device.

11. A system comprising:
a memory comprising instructions executable by one or more processors; and
the one or more processors coupled to the memory and operable to execute the instructions, the one or more processors being operable when executing the instructions to:
receive a request;
obtain a current state indicator from each of a plurality of systems, wherein:
the current state indicator of each of the plurality of systems is one of a plurality of state indicators in a state model;
the state model is configured to indicate discrete levels of workload for the plurality of systems, the discrete levels comprising:
a first discrete level comprising two or more state indicators that indicate that an associated system is operating below a capacity of the associated system and is configured to accept an increase in workload;
a second discrete level comprising two or more state indicators that indicate that an associated system is operating at or above the capacity of the associated system and is configured to accept an increase in workload if none of the plurality of systems are assigned a state indicator of the first discrete level; and
a third discrete level comprising two or more state indicators that indicate that an associated system is configured to deny an increase in workload; and
select one of the plurality of systems to service the request based on the current state indicator of each of the plurality of systems.

12. The system of claim 11, wherein the one system selected to service the request is a system currently having a lowest level of workload, as indicated by the state model, among the plurality of systems.

13. The system of claim 11, wherein:
the state model is represented as a Simple Network Management Protocol (SNMP) variable; and
the current state indicator of each of the plurality of systems is obtained from the system using a SNMP command.

14. The system of claim 11, wherein the current state indicator of each of the plurality of systems is obtained from the system using a Hypertext Transfer Protocol (HTTP) command.

15. The system of claim 11, wherein each of the plurality of systems determines its own current state indicator based on one or more resource metrics of the system.

16. The system of claim 11, wherein each of the plurality of systems determines its own current state indicator based on one or more workload metrics of the system.

17. The system of claim 11, wherein the plurality of systems is a plurality of intermediary network devices.

18. The system of claim 11, wherein the plurality of systems is a plurality of proxy devices.

19. The system of claim 11, wherein:
the plurality of systems is a plurality of caching devices; and
the request is a request for cached content.

20. The system of claim 11, wherein the one or more processors are further operable when executing the instructions to forward the request to the selected one system.

21. One or more computer-readable non-transitory storage media embodying software operable when executed by a computer system to:
receive a request;

obtain a current state indicator from each of a plurality of computer systems, wherein:
the current state indicator of each of the plurality of computer systems is one of a plurality of state indicators in a state model;
the state model is configured to indicate discrete levels of workload for the plurality of computer systems, the discrete levels comprising:
a first discrete level comprising two or more state indicators that indicate that an associated computer system is operating below a capacity of the associated computer system and is configured to accept an increase in workload;
a second discrete level comprising two or more state indicators that indicate that an associated computer system is operating at or above a capacity of the associated computer system and is configured to accept an increase in workload if none of the plurality of computer systems are assigned a state indicator of the first discrete level; and
a third discrete level comprising two or more state indicators that indicate that an associated computer system is configured to deny an increase in workload; and
select one of the plurality of computer systems to service the request based on the current state indicator of each of the plurality of computer systems.

22. The media of claim 21, wherein the one computer system selected to service the request is a computer system currently having a lowest level of workload, as indicated by the state model, among the plurality of computer systems.

23. The media of claim 21, wherein:
the state model is represented as a Simple Network Management Protocol (SNMP) variable; and
the current state indicator of each of the plurality of computer systems is obtained from the computer system using a SNMP command.

24. The media of claim 21, wherein the current state indicator of each of the plurality of computer systems is obtained from the computer system using a Hypertext Transfer Protocol (HTTP) command.

25. The media of claim 21, wherein each of the plurality of computer systems determines its own current state indicator based on one or more resource metrics of the computer system.

26. The media of claim 21, wherein each of the plurality of computer systems determines its own current state indicator based on one or more workload metrics of the computer system.

27. The media of claim 21, wherein the plurality of computer systems is a plurality of intermediary network devices.

28. The media of claim 21, wherein the plurality of computer systems is a plurality of proxy devices.

29. The media of claim 21, wherein:
the plurality of computer systems is a plurality of caching devices; and
the request is a request for cached content.

30. The media of claim 21, wherein the software is further operable when executed by the computer systems to forward the request to the selected one computer system.

31. The method of claim 1, wherein:
the first discrete level comprises a first state indicator;
the second discrete level comprises a second state indicator, wherein the second state indicator indicates a workload greater than the first state indicator;
the third discrete level comprises a third state indicator, wherein the third state indicator indicates a workload greater than the second state indicator; and
the method further includes, for a given electronic device assigned the third state indicator:
upon reduction of workload for the given electronic device sufficient to match workload of the second state indicator, maintaining assignment of the given electronic device to the third state indicator; and
upon further reduction of workload for the given electronic device sufficient to match workload of the first state indicator, reassigning the given electronic device from the third state indicator to the first state indicator.

32. The system of claim 11, wherein:
the first discrete level comprises a first state indicator;
the second discrete level comprises a second state indicator wherein the second state indicator indicates a workload greater than the first state indicator;
the third discrete level comprises a third state indicator workload, wherein the third state indicator indicates a workload greater than the second state indicator; and
the one or more processors are further operable when executing the instructions to, for a given system of the plurality of systems assigned the third state indicator:
upon reduction of workload for the given system sufficient to match workload of the second state indicator, maintain assignment of the given system to the third state indicator; and
upon further reduction of workload for the given system sufficient to match workload of the first state indicator, reassign the given system from the third state indicator to the first state indicator.

33. The media of claim 21, wherein:
the first discrete level comprises a first state indicator;
the second discrete level comprising a second state indicator of the state indicators, wherein the second state indicator indicates a workload greater than the first state indicator;
the third discrete level comprising a third state indicator, wherein the third state indicator indicates a workload greater than the second state indicator; and
the one or more processors are further operable when executing the instructions to, for a given computer system of the plurality of computer systems assigned the third state indicator:
upon reduction of workload for the given computer system sufficient to match workload of the second state indicator, maintain assignment of the given computer system to the third state indicator; and
upon further reduction of workload for the given computer system sufficient to match workload of the first state indicator, reassign the given computer system from the third state indicator to the first state indicator.

* * * * *